(12) United States Patent
Sinha et al.

(10) Patent No.: US 11,262,100 B1
(45) Date of Patent: Mar. 1, 2022

(54) SYSTEM AND METHOD FOR THE CAPTURE AND USE OF HEAT FROM THE WASTEWATER OF COMMERCIAL DISHWASHERS

(71) Applicants: Sunil Sinha, Katy, TX (US); Gopal Basak, Katy, TX (US)

(72) Inventors: Sunil Sinha, Katy, TX (US); Gopal Basak, Katy, TX (US)

(*) Notice: Subject to any disclaimer, the term of this patent is extended or adjusted under 35 U.S.C. 154(b) by 66 days.

(21) Appl. No.: 16/505,122

(22) Filed: Jul. 8, 2019

Related U.S. Application Data

(63) Continuation-in-part of application No. 16/159,651, filed on Oct. 13, 2018, now Pat. No. 10,969,179.

(51) Int. Cl.
| | |
|---|---|
| *F24H 4/02* | (2006.01) |
| *F25B 30/02* | (2006.01) |
| *F25B 30/06* | (2006.01) |
| *A47L 15/00* | (2006.01) |
| *A47L 15/42* | (2006.01) |

(52) U.S. Cl.
CPC ............ *F24H 4/02* (2013.01); *A47L 15/0078* (2013.01); *A47L 15/4214* (2013.01); *A47L 15/4285* (2013.01); *F25B 30/02* (2013.01); *F25B 30/06* (2013.01); *A47L 2401/06* (2013.01); *A47L 2401/34* (2013.01); *A47L 2501/06* (2013.01); *F25B 2400/01* (2013.01)

(58) Field of Classification Search
CPC .. F24H 4/02; F25B 30/06; F25B 30/02; A47L 15/0078; A47L 15/4285; A47L 15/4214; A47L 2501/06; A47L 2401/06; A47L 2401/34
See application file for complete search history.

(56) References Cited

U.S. PATENT DOCUMENTS

| | | | | |
|---|---|---|---|---|
| 4,094,170 | A | * | 6/1978 | Kantor .................... F01K 11/04 165/85 |
| 4,410,791 | A | ‡ | 10/1983 | Eastep |
| 4,517,810 | A | * | 5/1985 | Foley .................. F24D 11/0214 62/186 |
| 4,821,793 | A | ‡ | 4/1989 | Sheffield |
| 5,243,825 | A | * | 9/1993 | Lin ........................ F24F 5/0096 62/123 |
| 5,740,857 | A | ‡ | 4/1998 | Thompson et al. |
| 5,791,401 | A | ‡ | 8/1998 | Nobile |
| 6,640,048 | B2 | ‡ | 10/2003 | Novotny et al. |

(Continued)

*Primary Examiner* — Henry T Crenshaw
(74) *Attorney, Agent, or Firm* — Egbert, McDaniel & Swartz, PLLC

(57) ABSTRACT

Systems and methods for providing hot water to a commercial dishwasher are provided. A first heat exchanger is provided in a first enclosure, and is used to heat water from a cold water source. The heated water is provided to the commercial dishwasher for use. A second heat exchanger is provided in a second enclosure, and is used to collect waste heat from the wastewater of the commercial dishwasher. A refrigerant coil loop passes through the first heat exchanger and the second heat exchanger, and allows for the use of the waste heat. The first heat exchanger is a condenser provided within a condenser chamber, the condenser connected to a compressor. The second heat exchanger is an evaporator within an evaporator chamber, the evaporator connected to an expansion valve.

16 Claims, 16 Drawing Sheets

(56) References Cited

U.S. PATENT DOCUMENTS

| | | | |
|---|---|---|---|
| 6,722,421 B2 ‡ | 4/2004 | MacKelvie | |
| 7,096,885 B2 ‡ | 8/2006 | Van Decker | |
| 7,322,404 B2 ‡ | 1/2008 | Van Decker et al. | |
| 7,543,456 B2 ‡ | 6/2009 | Sinha et al. | |
| 8,752,614 B2 ‡ | 6/2014 | Uhrig | |
| 2004/0131346 A1 ‡ | 7/2004 | Chamberlain, Jr. | |
| 2005/0183772 A1 * | 8/2005 | LaPrise | F24D 17/00 137/337 |
| 2007/0138327 A1 * | 6/2007 | Berger | E03C 1/184 241/46.13 |
| 2009/0093914 A1 * | 4/2009 | Khoury | F25B 41/22 700/282 |
| 2013/0305747 A1 * | 11/2013 | Krische | F25B 30/00 62/79 |
| 2014/0202185 A1 * | 7/2014 | Wong | F25D 21/04 62/89 |
| 2018/0028042 A1 * | 2/2018 | Heinle | A47L 15/46 |
| 2018/0230860 A1 * | 8/2018 | Maier | F02G 5/02 |
| 2020/0187749 A1 * | 6/2020 | Bertram | A47L 15/4285 |

\* cited by examiner
‡ imported from a related application

SYSTEM AND METHOD FOR THE CAPTURE AND USE OF HEAT FROM THE WASTEWATER OF COMMERCIAL DISHWASHERS

CROSS-REFERENCE TO RELATED APPLICATIONS

The present application is a continuation-in-part of U.S. application Ser. No. 16/159,651, filed on Oct. 13, 2018, presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

Various embodiments of the present disclosure relate generally to heat pump, liquid heating or cooling, and related methods. More specifically, embodiments of the present disclosure relate to systems and methods for exchanging thermal energy between a drain liquid and a source liquid. Even more specifically, the preferred embodiments of the present disclosure relate to exchanging thermal energy between drain liquid from a commercial/industrial dishwasher, and a source liquid.

2. Description of Related Art Including Information Disclosed Under 37 CFR 1.97 and 37 CFR 1.98

Heat Pumps have been popular for heating and cooling air inside a building. A heat pump may include, for example, an evaporator, a condenser, an expansion device and a compressor that assist in the transportation of thermal energy. The heat pump technology has been applied in heating water, taking heat from the air. However, this heat pump water heating technology has not gained successful adoption in the market. The main reason for this failure is the fact that this air-based heat pump system is either inefficient or susceptible to failure when the ambient temperature becomes cold. Most of the time the system is located indoor and heat energy is extracted from the indoor air. During winter time, the indoor warm air gets cold when the air-based heat pump system is used. Sometimes the system is placed in a small confined place (for example, apartment or closet) and there is not adequate air available for the system to work efficiently. Another reason for failure includes a failure of the compressor when freezing happens. Other challenges include a high cost of maintenance associated with management of evaporator freezing controls e.g. a refrigerant reversible valve, which also becomes ineffective in subfreezing ambient temperature. Loud noises arising from the fan of the heat pump creates inconvenience. Thus, a desire exists for a system and method that may be useful for heating water or any liquid using heat pump that addresses one or more of the above-described shortcomings. Furthermore, another desire exists to cool water or any other liquid in the hot climatic zones using heat pump. Furthermore, another desire exists to heat and cool any liquid on demand without storing the liquid.

Commercial dishwashers come in many different types and sizes, and are used in nearly all restaurant settings throughout the world. The type of dishwasher used by a restaurant is determined based upon the particular needs of the restaurant. However, a common type of commercial dishwasher comprises an enclosure having a single or multiple racks therein, wherein the enclosure is situated on a stand so that the enclosure is positioned above the ground surface. This type of commercial dishwasher can include top mounted controls with built-in chemical pumps and other systems enabling washing of the dishes. A wastewater drain from the enclosure is typically provided midway up the stand below the enclosure. These commercial dishwashing machines typically have cycle times of approximately 1 minute and can be rated with operating temperatures between 125° F. and 180° F.

Other types of commercial dishwashers include conveyor type commercial dishwashers for larger volume operations. Under-counter commercial dishwashing machines are also available which generally resemble the door-type machines, but have a smaller stand.

As can be appreciated, the electrical requirements associated with the commercial dishwasher can represent a great proportion of the electrical needs of the restaurant, as a significant amount of energy is expended to heat the water to the required temperatures. As such, efficiency in commercial dishwashing technology is particularly important in areas where energy cost including gas and electricity may be very high, for example, in Hawaii.

Various types of water heating systems are utilized to heat water for commercial dishwashers, including tankless water heating systems. When the air-based heat pump technology is used for the dishwasher, the system is likely to be impractically big and costly. Air handling system required for this type of heat pump will demand huge installation cost.

It is an object of the present invention to provide a system and method of providing hot water to a commercial dishwasher.

It is another object of the present invention to provide a commercial dishwashing system and method which reduces electrical needs.

It is another object of the present invention to provide a commercial dishwashing system and method which recovers waste heat from the drained wastewater of the commercial dishwasher.

It is another object of the present invention to provide a commercial dishwashing system and method which does not need to be connected to a conventional water heating system.

These and other objects and advantages of the present invention will become apparent from a reading of the attached specification and appended claims.

BRIEF SUMMARY OF THE INVENTION

The present invention is a system for providing hot water to a commercial dishwasher, the dishwasher having a hot water inlet and a wastewater outlet. The system includes a first heat exchanger connected to the hot water inlet of the dishwasher and to a cold water source. The first heat exchanger has a condenser. A second heat exchanger is provided, which is connected to the wastewater outlet of the dishwasher. The second heat exchanger has an evaporator. A coil loop has a refrigerant therein and passes the refrigerant through a compressor into the condenser of the first heat exchanger. The coil loop passes the refrigerant from the condenser of the first heat exchanger through an expansion valve and into the evaporator of the second heat exchanger.

In an embodiment, the first heat exchanger and the compressor are positioned in a first enclosure, while the second heat exchanger and the expansion valve are positioned in a second enclosure. Preferably, the second enclosure is positioned adjacent the wastewater outlet of the dishwasher.

In an embodiment, the first heat exchanger, the compressor and the expansion valve are positioned in a first enclosure, while the second heat exchanger is positioned in a second enclosure.

In an embodiment, the first heat exchanger, the compressor and the expansion valve the second heat exchanger are positioned together in one enclosure.

In an embodiment, a pump may be positioned between the wastewater outlet of the dishwasher and the second enclosure.

In an embodiment, the condenser is positioned within a condenser chamber which is adapted to receive cold water from the cold water source.

In an embodiment, the evaporator is positioned within an evaporator chamber. The evaporator chamber is adapted to cool hot water received from the wastewater outlet of the dishwasher. The evaporator chamber may be a plumbing trap.

In an embodiment, an electrical coil heater may be positioned between the first heat exchanger and hot water inlet of the dishwasher.

In an embodiment, the system may further include a temperature sensor positioned to monitor the temperature of the evaporator. Controls may be provided in communication with the temperature sensor and which are operative to turn off the compressor in the event of a freezing condition at the evaporator.

The present invention is also a commercial dishwashing system having a dishwasher with a hot water inlet and a wastewater outlet. A first enclosure is connected to a cold water source and to the hot water inlet of the dishwasher. The first enclosure has a first heat exchanger therein, which is adapted to keep cold water from the cold water source and to pass the heated water to the hot water inlet of the dishwasher. A second enclosure is connected to the wastewater outlet of the dishwasher. The second enclosure has a second heat exchanger therein which is adapted to capture heat from wastewater flowing from the wastewater outlet of the dishwasher. A coil is provided with a refrigerant therein. The coil is a loop for passing the refrigerant between the first enclosure and the second enclosure.

In an embodiment, the first enclosure includes a compressor and a condenser chamber with the condenser therein. The condenser is connected to the compressor, and the condenser chamber is adapted to receive cold water from the cold water source. The compressor and condenser are fluidly connected in-line with the coil.

In an embodiment, the second enclosure includes an expansion valve and an evaporator chamber with an evaporator therein. The evaporator is connected to the expansion valve. The evaporator chamber is adapted to receive hot wastewater from the wastewater outlet of the dishwasher. The expansion valve and evaporator fluidly connected in-line with the coil. Preferably, the evaporator chamber comprises a plumbing trap.

In an embodiment, a pump may be positioned between the wastewater outlet of the dishwasher and the second enclosure.

In an embodiment, a temperature sensor may be positioned to monitor the temperature of the evaporator. Controls will be provided in communication with the temperature sensor, and which are operative to turn off the compressor in the event of a freezing condition at the evaporator.

In an embodiment, a tee may be positioned between the first enclosure and the hot water inlet of the dishwasher. The tee is connected to a hot water source.

The present invention is also a method for providing hot water to a commercial dishwasher. The method includes steps of: providing a coil loop having a refrigerant therein, said coil passing between a first heat exchanger and a second heat exchanger; flowing cold water into said first heat exchanger; compressing the refrigerant; heating the passed cold water within the first heat exchanger with the compressed refrigerant; flowing the heated water to the commercial dishwasher for use therein; draining the used heated water into a second heat exchanger; expanding the refrigerant; and heating the expanded refrigerant within the second heat exchanger with the drained heated water.

In the method of the present invention, an electrically heater may be provided between the first heat exchanger in the commercial dishwasher.

In an embodiment, the first heat exchanger may include a condenser within the condenser chamber, wherein cold water is flowed into the condenser chamber.

In an embodiment, the second heat exchanger includes evaporator within an evaporator chamber, wherein the used heated water is drained into the evaporator chamber, and evaporator chamber is adapted to delay the release of used heated water.

This foregoing Section is intended to describe, in generality, the preferred embodiments of the present invention. It is understood that modifications to these preferred embodiments can be made within the scope of the present invention. As such, this Section should not to be construed, in any way, as limiting of the broad scope of the present invention. The present invention should only be limited by the following claims and their legal equivalents.

BRIEF DESCRIPTION OF THE SEVERAL
VIEWS OF THE DRAWINGS

The accompanying drawings, which are incorporated in and constitute a part of this specification, illustrate various exemplary embodiments, and together with the description, serve to explain the principles of the disclosed embodiments.

For simplicity and clarity of illustration, elements in the figures here are not necessarily drawn to the scale. For example, the dimensions of some elements may be magnified when compared to other elements for clarity. Further, where considered appropriate, reference labels have been repeated among the figures to indicate corresponding or similar elements.

Figure 4:
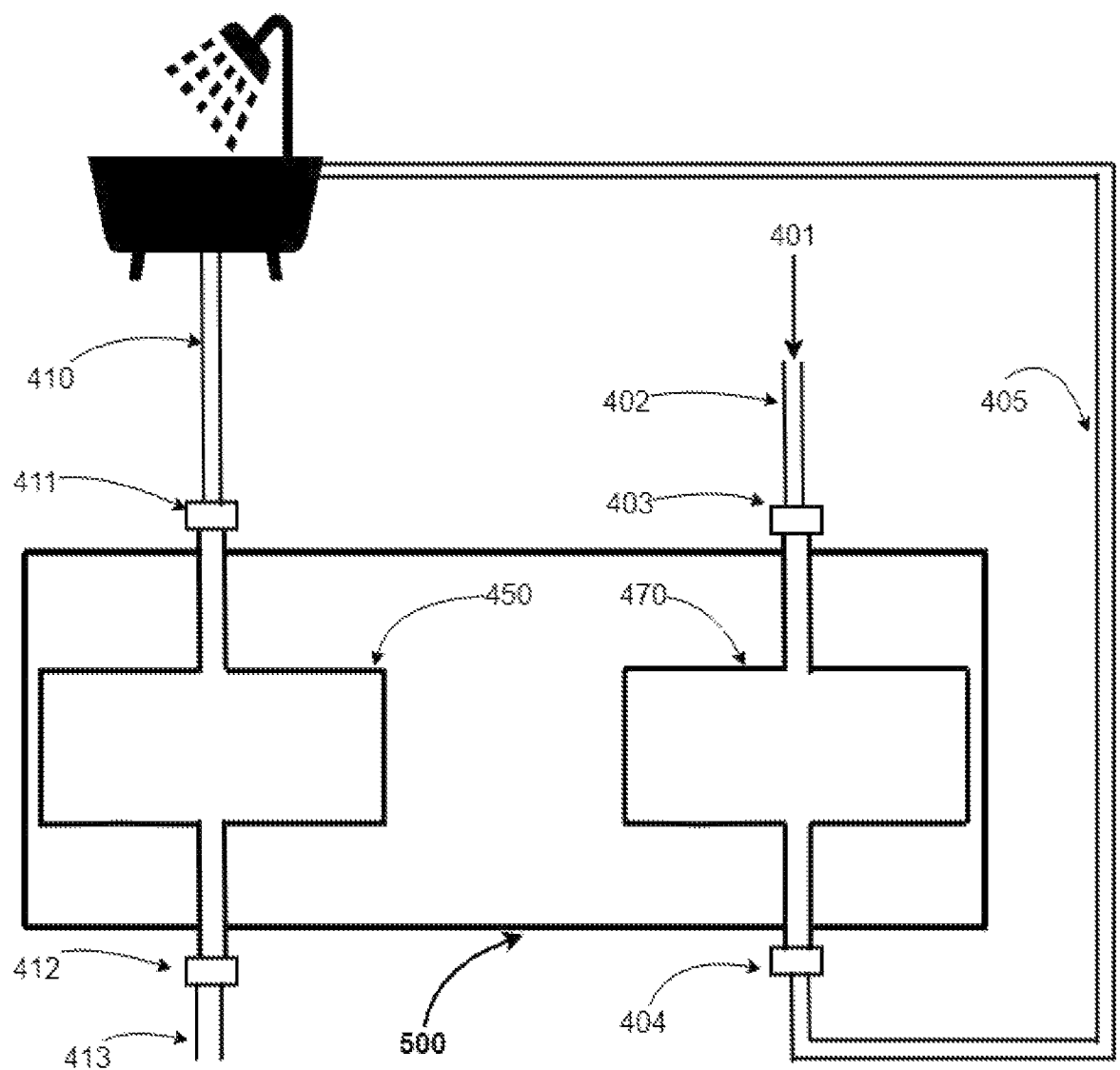
FIG. 4 depicts a pictorial and graphical diagram of the liquid (e.g., water) cooling system based on heat transfer from the drain liquid in a bathroom or community shower, according to an exemplary embodiment of the present disclosure.
Figure 5:
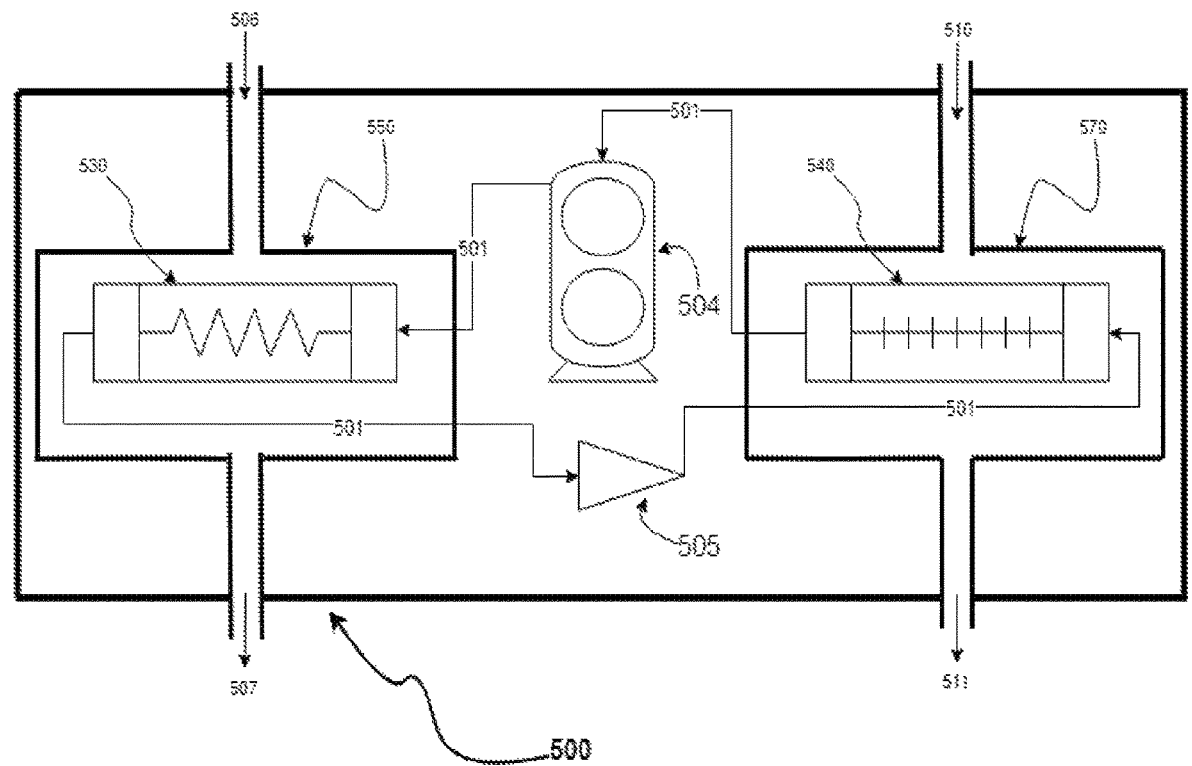

FIG. 5 depicts a pictorial and graphical diagram of the liquid to liquid heat pump device that is a component in all embodiments, according to an exemplary embodiment of the present disclosure. This component is illustrated as a rectangle and labeled as reference number '500' in FIG. 2, FIG. 3 and FIG. 4. The rectangle is broken down in two parts in FIG. 1 to indicate preferred locations of the components in one of the embodiments—one part (103) is located inside the building and the other part (102) is located outside the building.

Figure 6:
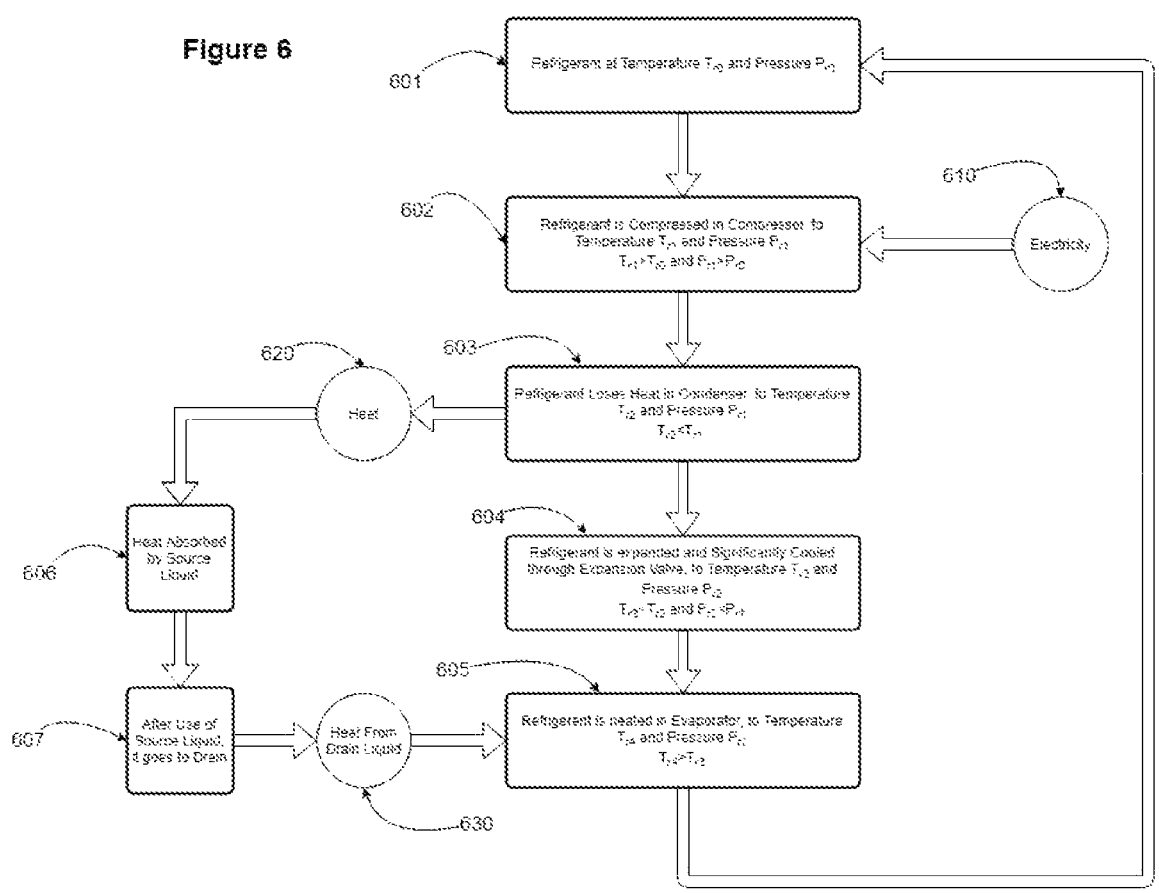

FIG. 6 is a block diagram of a general method of drain based liquid heating, according to an exemplary embodiment of the present disclosure.

Figure 7:
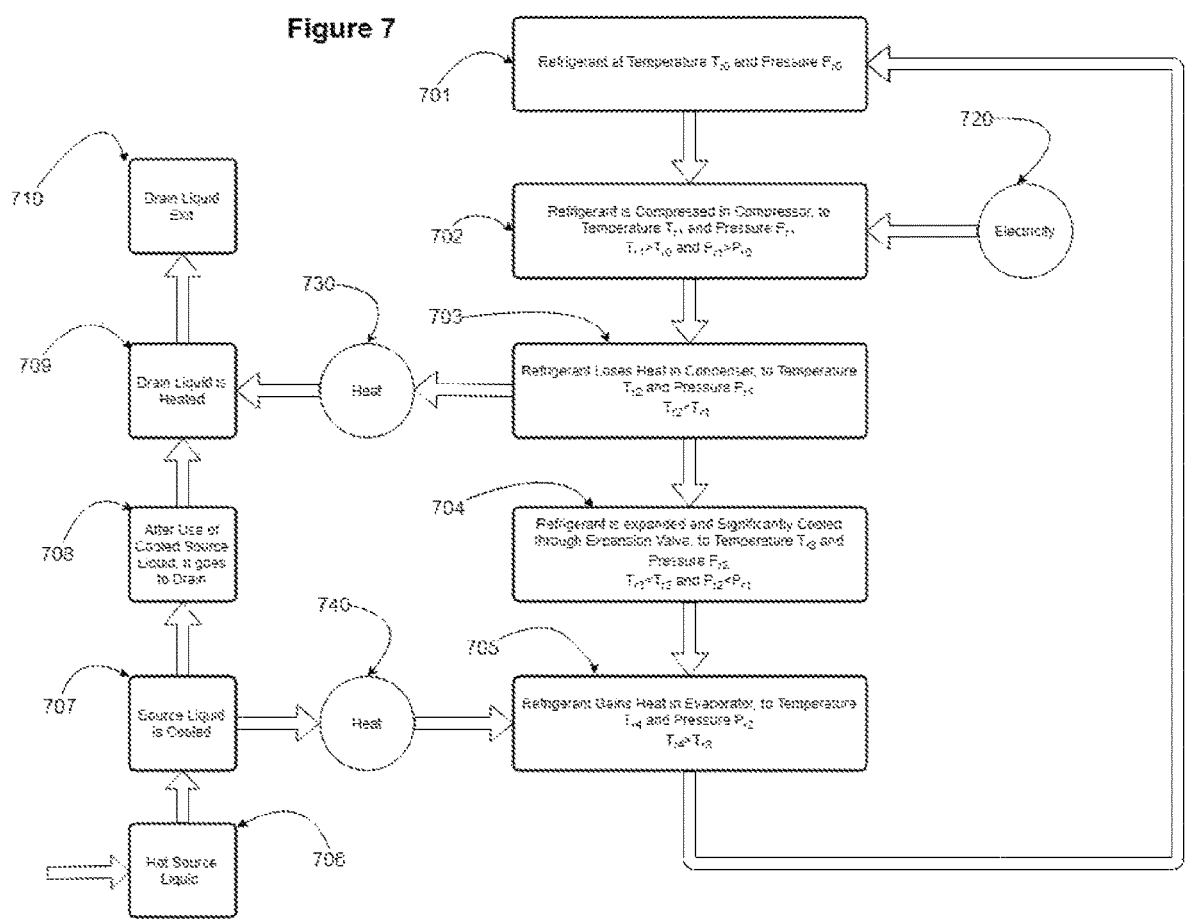

FIG. 7 is a block diagram of a general method of drain based liquid cooling, according to an exemplary embodiment of the present disclosure.

Figure 8:
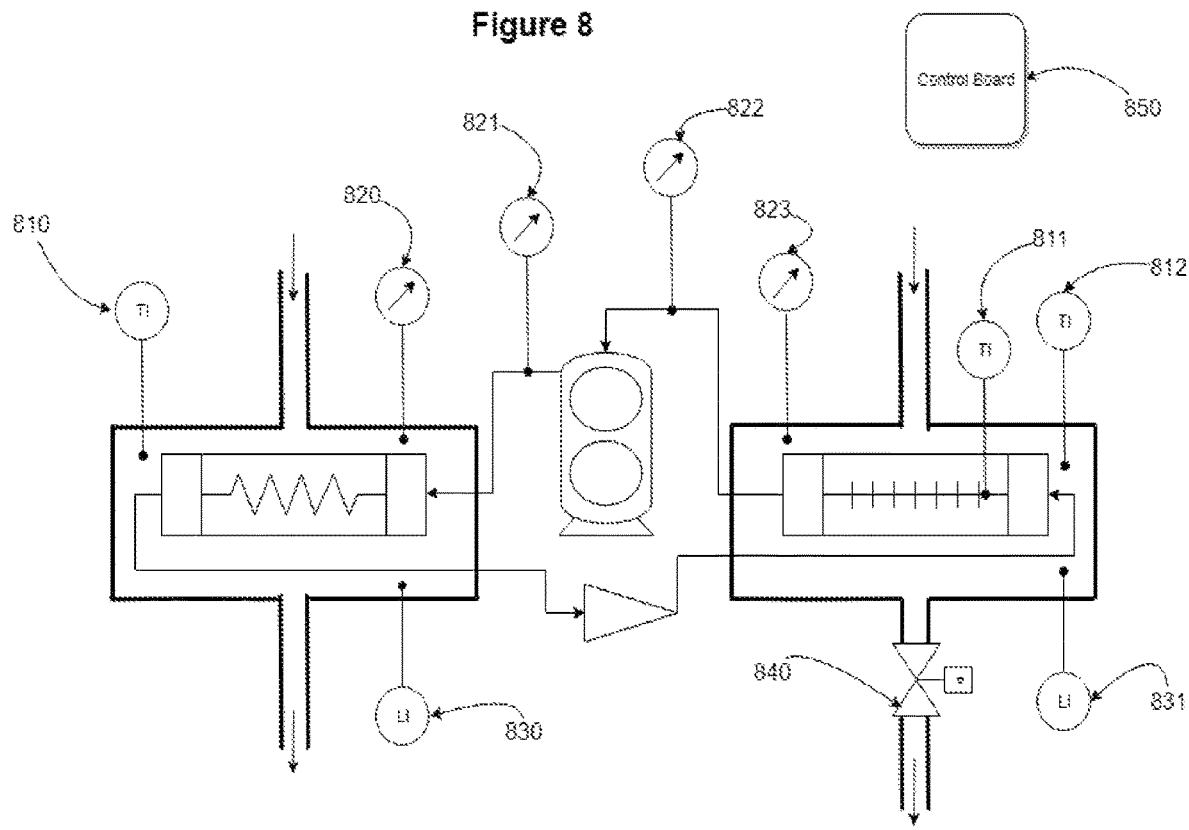

FIG. 8 depicts a pictorial and graphical diagram of the components for controls and measurements of physical properties within an exemplary liquid to liquid head pump device, according to an exemplary embodiment of the present disclosure.

Figure 9:
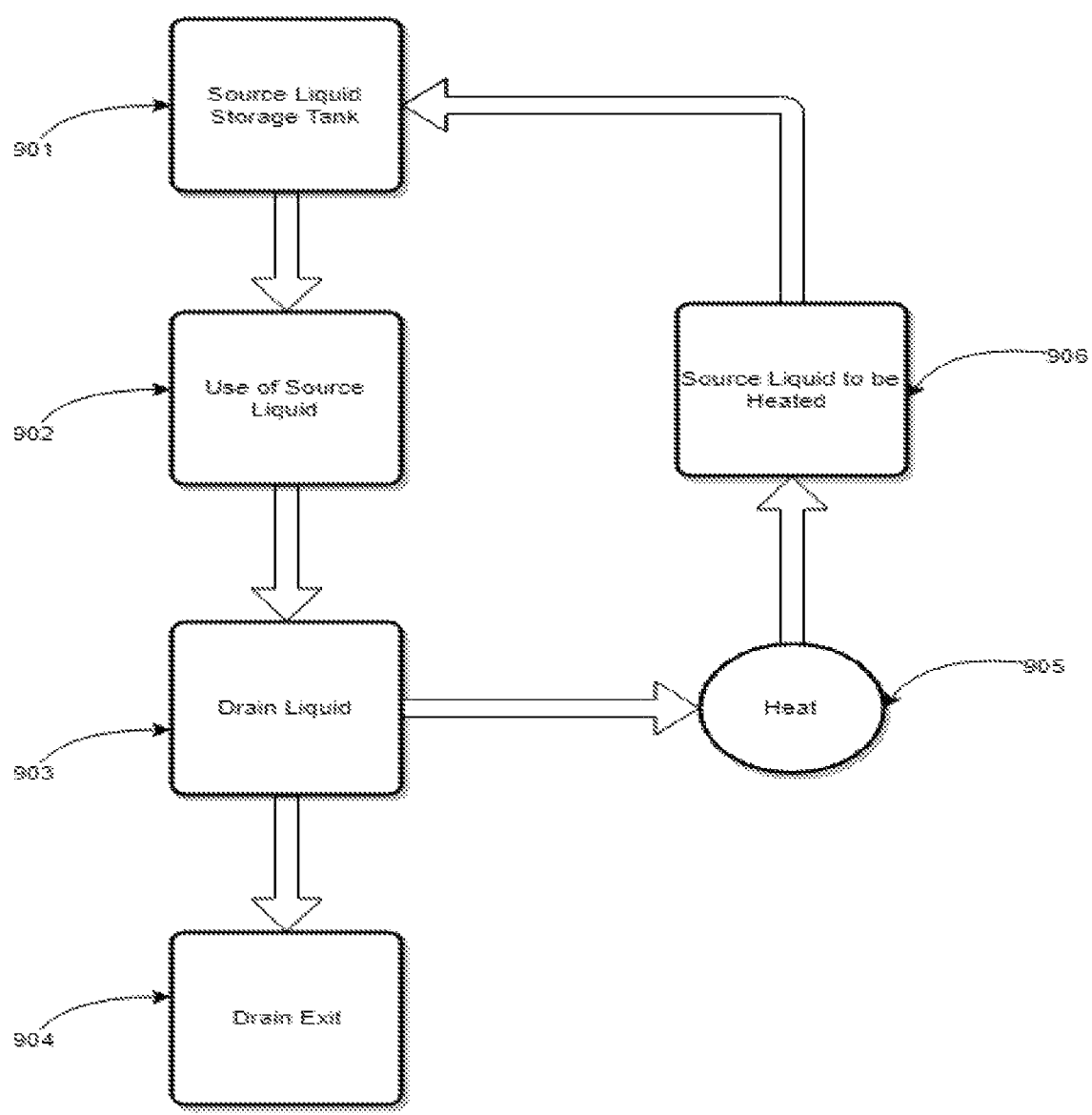

FIG. 9 is a block diagram of a general method of drain liquid based liquid heating in a storage tank using thermal energy extracted from the drain liquid, according to an exemplary embodiment of the present disclosure.

Figure 10:
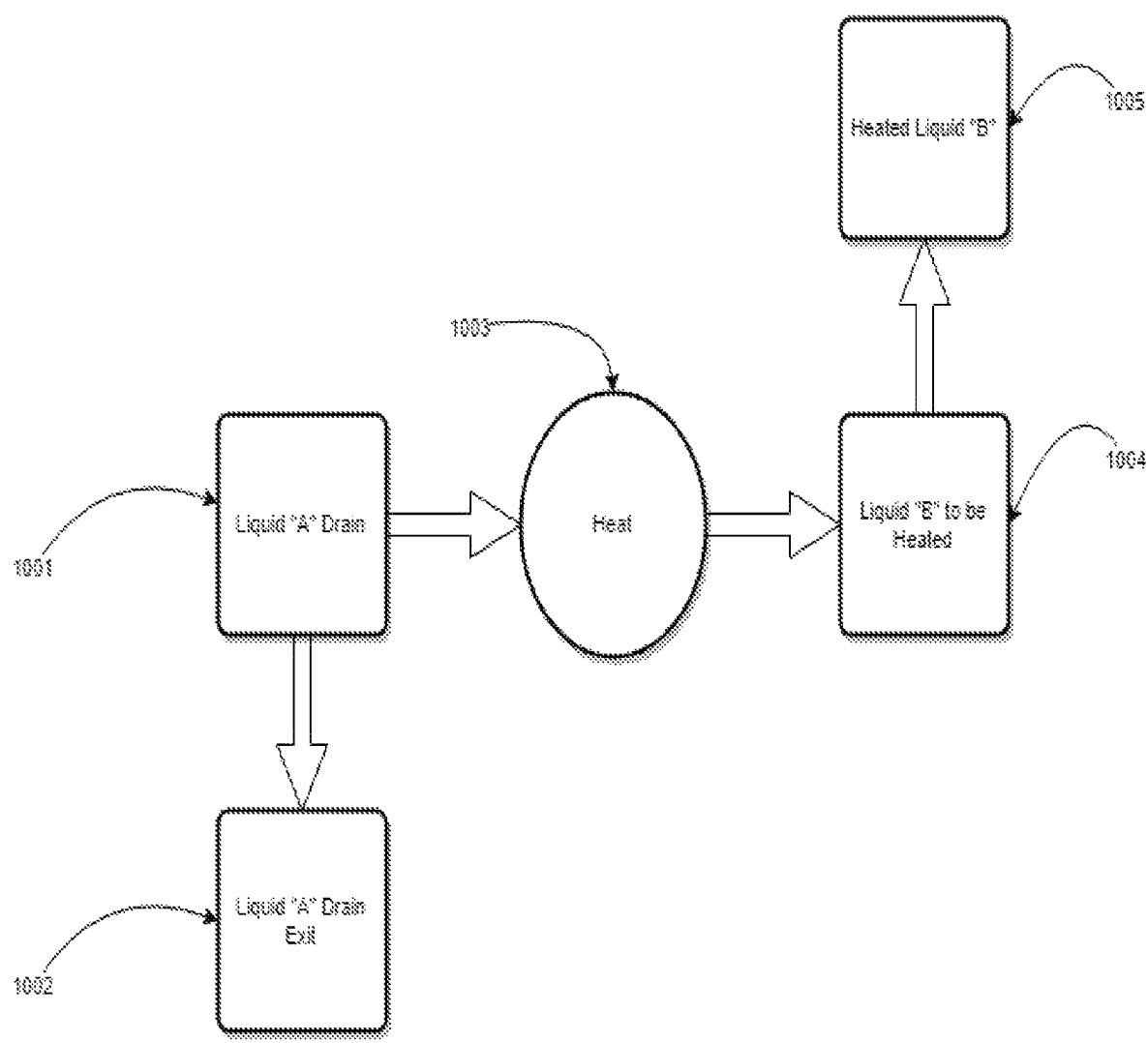

FIG. 10 is a block diagram of a general method of heating a liquid (Liquid "B") using thermal energy extracted from another liquid (Liquid "A"), according to an exemplary embodiment of the present disclosure.

Figure 11:
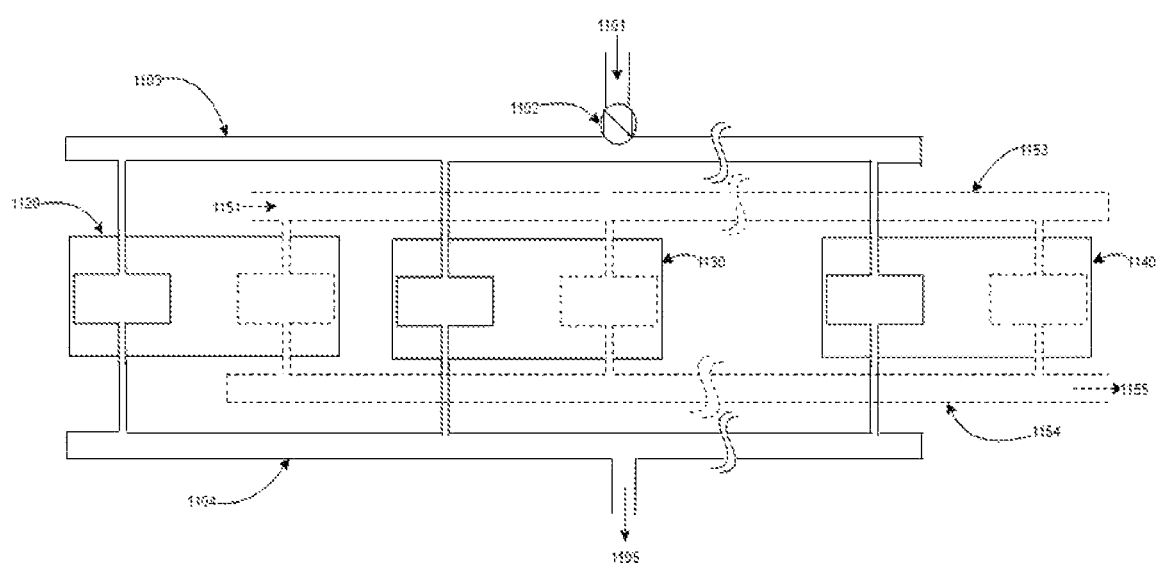

FIG. 11 depicts a pictorial and graphical diagram of a system comprising of a plurality of systems described herein (e.g., as depicted in FIG. 5) that are combined together for heating and/or cooling a source liquid, according to an exemplary embodiment of the present disclosure.

Figure 12:
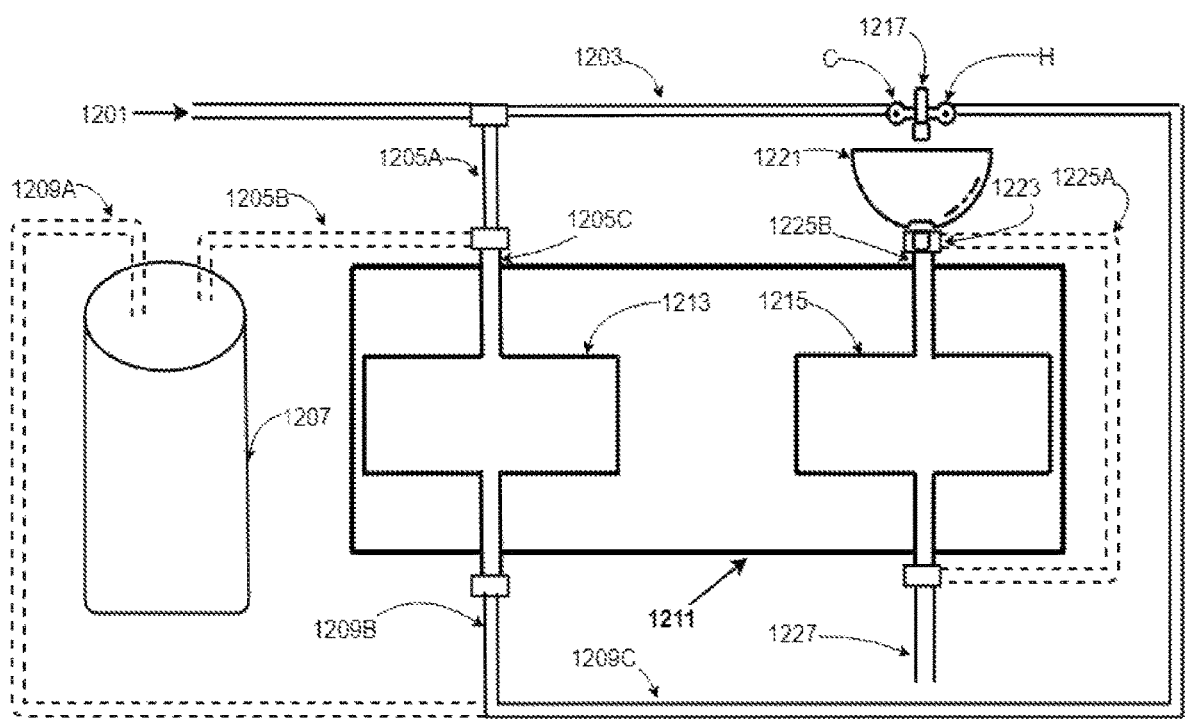

FIG. 12 depicts a pictorial and graphical diagram illustrating the assembly of a drain liquid based liquid heater (e.g., as the system depicted in FIG. 2), according to an exemplary embodiment of the present disclosure. The diagram illustrates exemplary methods for the assembly.

Figure 13:
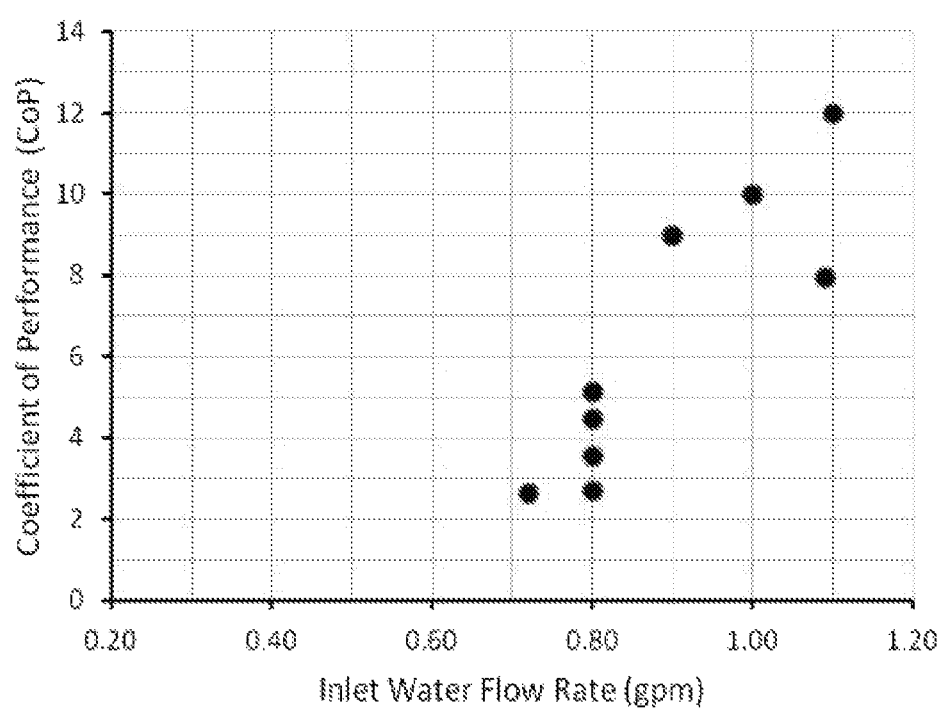

FIG. 13 depicts a graphical diagram of the experimental results obtained for a drain liquid based liquid heater (e.g., as the system depicted in FIG. 2), according to an exemplary embodiment of the present disclosure. The results are depicted as Coefficient of Performance (CoP) of the system for various inlet water flow rates.

Figure 14:
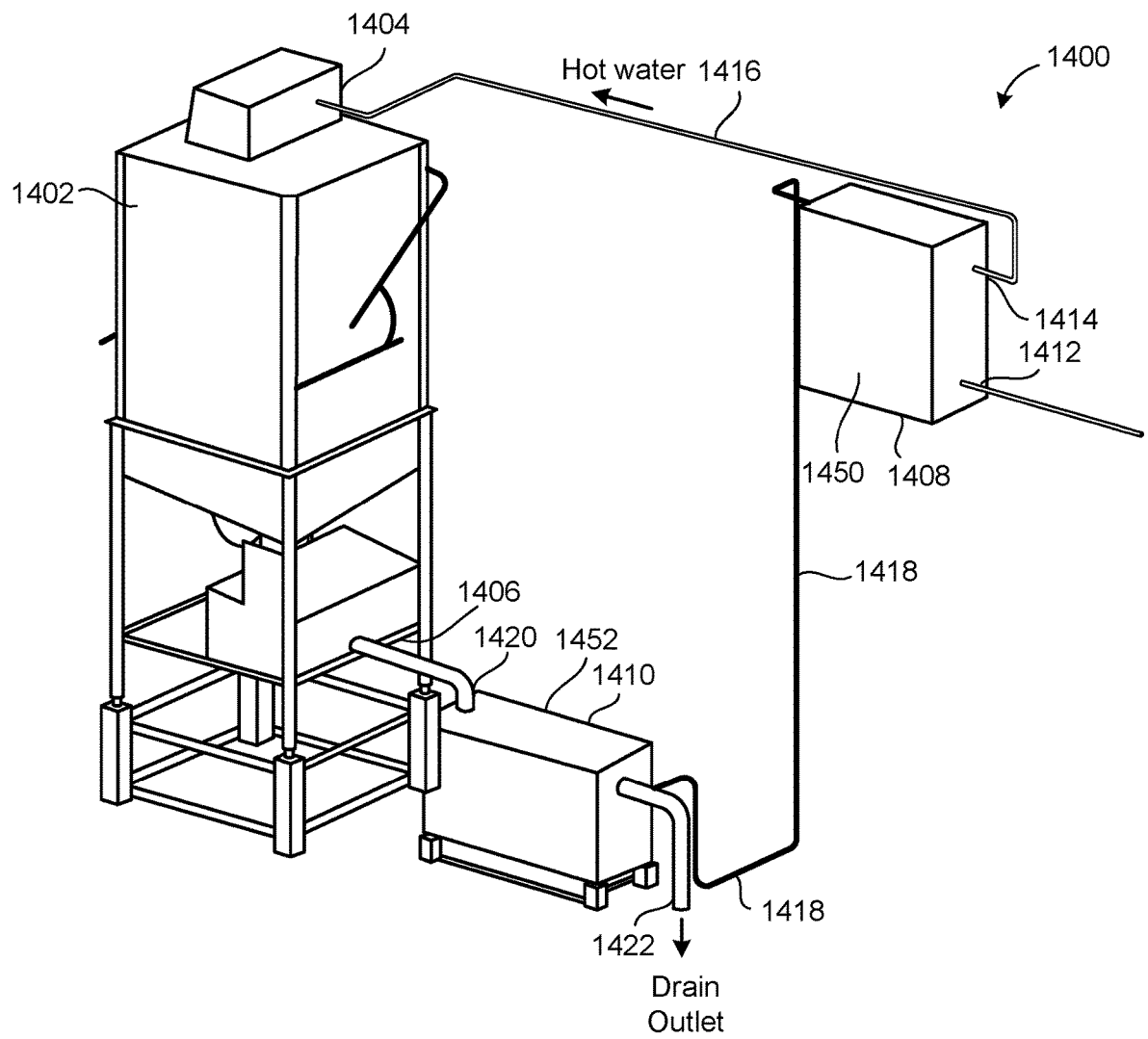

FIG. 14 illustrates the system and method of the preferred embodiment of the present disclosure, wherein the system operates to exchange thermal energy between drain liquid from a commercial dishwasher and a source liquid for the commercial dishwasher.

Figure 14A:
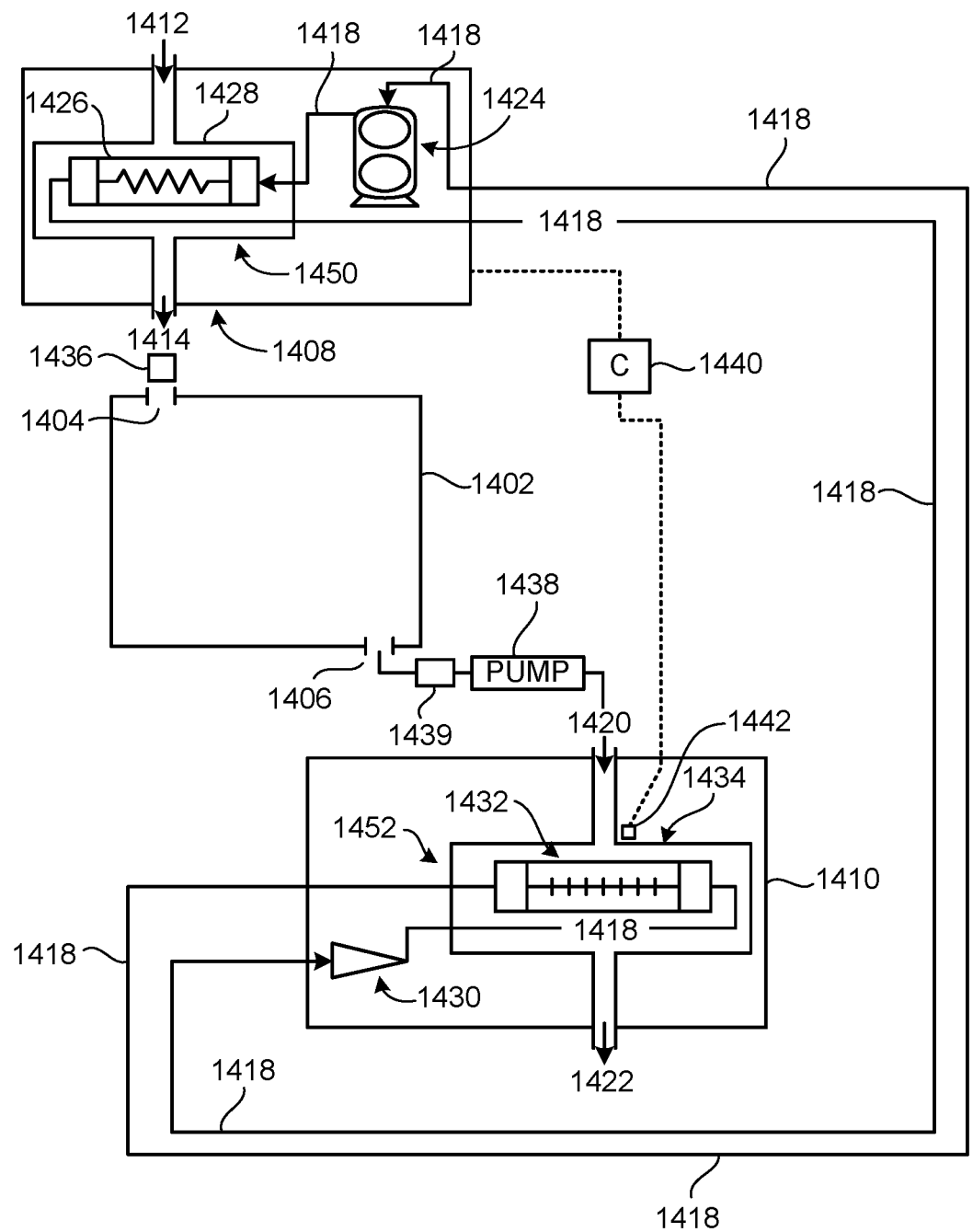

FIG. 14A depicts a pictorial and graphical diagram of the system and method as shown in FIG. 14.

Figure 15:
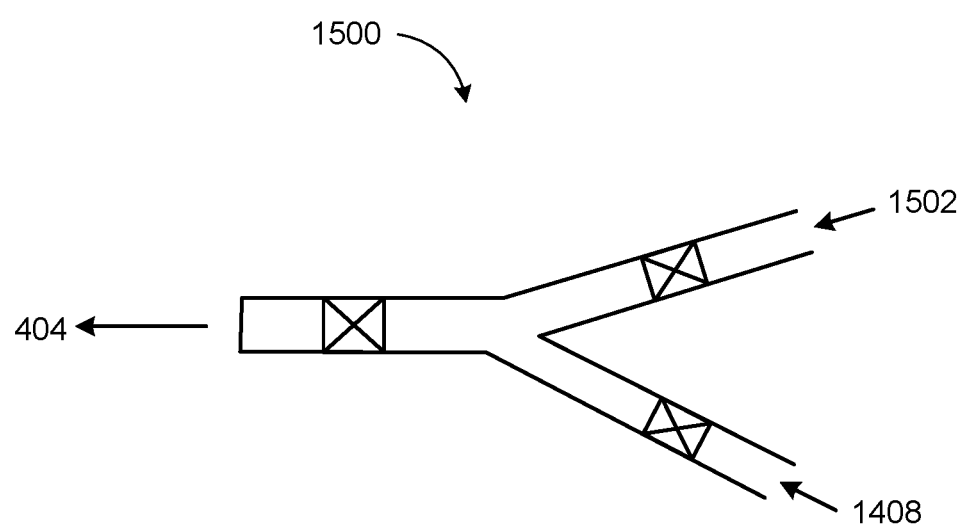

FIG. 15 depicts a tee which may be used to connect the system of the preferred embodiment of the present invention with an existing hot water system.

DETAILED DESCRIPTION OF THE INVENTION

Reference will now be made in detail to the exemplary embodiments of the disclosure, examples of which are illustrated in the accompanying drawings. Wherever possible, the same reference numbers will be used throughout the drawings to refer to the same or like parts.

This discussion should not be construed, however, as limiting the invention to those particular embodiments; practitioners skilled in the art will recognize numerous other embodiments as well. For definition of the complete scope of the disclosure, the reader is directed to appended claims.

Various embodiments of the present disclosure describe novel and nonobvious methods, systems and apparatuses of heating or cooling liquid. In some embodiments, a heat pump or heat pump facility may transfer thermal energy between a source liquid that may be used by a user ("source liquid") and a drained waste liquid ("drain liquid"). The heat pump or heat pump facility may include one or more of a compressor, a condenser, an evaporator, a refrigerant, a refrigerant expansion valve, and a refrigerant filter, and a means for carrying the refrigerant in a cycle traversing the compressor, the condenser, the expansion valve and the evaporator. The condenser may be enclosed in a condenser chamber and the evaporator may be enclosed in an evaporator chamber. In various embodiments, the condenser chamber or the evaporator chamber, having a means to allow a flow or volume of liquid in for heat exchange, may be referred to as a heat exchanger. The said means may include, for example, an inlet for a source liquid or drain liquid to flow in or for a volume of the source liquid or drain liquid to collect (e.g., as a reservoir) before it overflows. The said means may additionally include an outlet for the source liquid or drain liquid to flow out from the heat exchanger.

The compressor may heat the refrigerant via compression and the expansion valve may cool the refrigerant via expansion. In some embodiments, the evaporator chamber may include a drain liquid inlet and a drain liquid outlet for heating the source liquid, and the condenser chamber may include a cold liquid inlet and a hot liquid outlet for heating the source liquid. In further embodiments, the evaporator chamber may include a hot source liquid inlet and cold source liquid outlet for cooling the source liquid, and the condenser chamber may include a hot liquid inlet and cold liquid outlet for cooling the source liquid.

In some embodiments, in addition to or as an alternative to an expansion valve, another pressure-lowering device may be used (e.g., metering device, capillary tube, a work-extracting device, a turbine, etc.).

Some embodiments have applications in residential and commercial buildings, and industrial processes. For example, in residential applications, some embodiments of the present disclosure can be used in central water heating. Some aspects can also be used as point of use applications in washroom sinks, showers and kitchen sinks. In commercial settings, some embodiments described herein can be used for central water heating and cooling. Some aspects of the present disclosure can also be used as point-of-use applications as in commercial wash basins, common showers, kitchens, dishwashers, cloth washers, etc. In industrial settings, some embodiments of the present disclosure can be used for heating and cooling of various liquids used in food and beverage processing, e.g., milk, alcohol, water, chemicals etc.

The liquid to liquid heat pump can facilitate a heat transfer between two liquids, e.g., Liquid "A" and Liquid "B", through the use of a refrigerant. In some embodiments, a refrigerant may be volatile evaporating and condensing fluid, in its gaseous state, which may be pressurized and circulated through the system, e.g., by a compressor. The refrigerant can travel through a means for carrying the refrigerant in a cycle (e.g., "cyclical pathway") traversing the compressor, the condenser, the expansion valve and the evaporator. the means may include, but are not limited to, a coil, a pipe, a pathway through various chambers (e.g., a condenser chamber, an evaporator chamber, etc.), a conduit, or a continuous space. As the refrigerant travels through these means, the temperature of the refrigerant may rapidly change depending on how the refrigerant is altered. For example, as the refrigerant travels through the compressor, the compression of the refrigerant caused by the compressor may rapidly heat up the refrigerant. The resulting hot and pressurized refrigerant may enter the condenser chamber where the heat exchanger carrying the refrigerant may come in contact with cold Liquid "A" from the supply line. Heat transfer may occur between the heated refrigerant and the Liquid "A," resulting in hot liquid.

Likewise, the coil carrying the refrigerant may enter an expansion valve, where expansion of the refrigerant caused by the expansion valve may rapidly cool down the refrigerant. The resulting cold refrigerant may enter the evaporator chamber where the heat exchanger carrying the refrigerant may come in contact with Liquid "B" from the liquid input line. Heat transfer may occur between the cold refrigerant and the Liquid "B", resulting in a flow of heat from the liquid to the refrigerant.

The process of heat transfer in the evaporator chamber may allow for the cool refrigerant to warm up before it enters into the compressor for raising its pressure and temperature.

In some embodiments, e.g., for heating liquids, Liquid "A" can be the source liquid and Liquid "B" can be the drain liquid. For examples, liquid B can be a drained water or waste water. In some embodiments, e.g., for cooling liquids, Liquid "A" can be the drain liquid and Liquid "B" can be the source liquid. For examples, liquid A can be a drained water or waste water.

Figure 1:
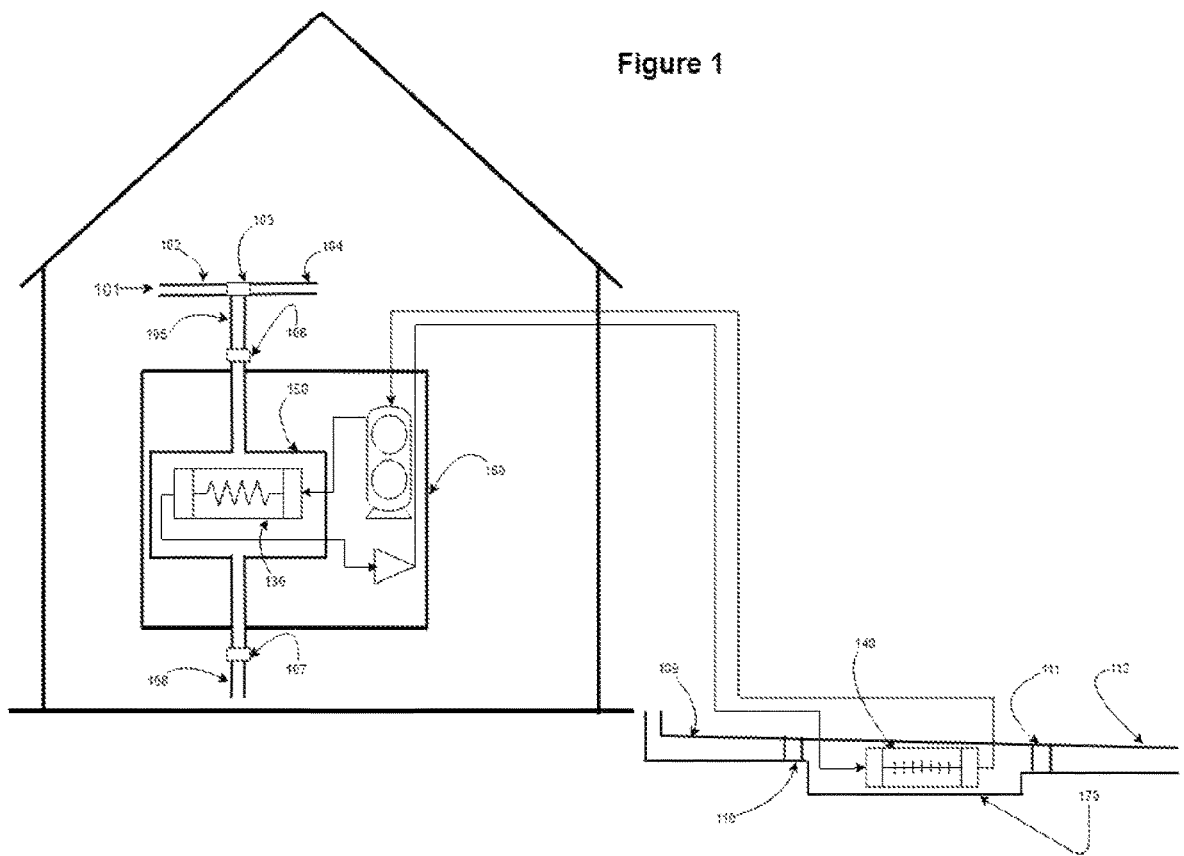
FIG. 1 depicts a pictorial and graphical diagram of a drain liquid based liquid heater for a building e.g., residential, commercial, industrial, institutional etc, according to an exemplary embodiment of the present disclosure.

FIG. 1 depicts a pictorial and graphical diagram of a drain liquid based liquid heater for a building e.g., residential, commercial, industrial, institutional etc., according to an exemplary embodiment of the present disclosure. Furthermore, while FIG. 1 depicts an exemplary embodiment for heating a source liquid using thermal energy extracted from the drain liquids of a building e.g., residential, commercial, industrial, institutional etc. . . . , FIG. 2 and FIG. 3 depict exemplary embodiments for heating a source liquid in Point-of-Use (POU) applications and settings, e.g., in a kitchen sink, bathroom sink, shower, etc.

Figure 2:
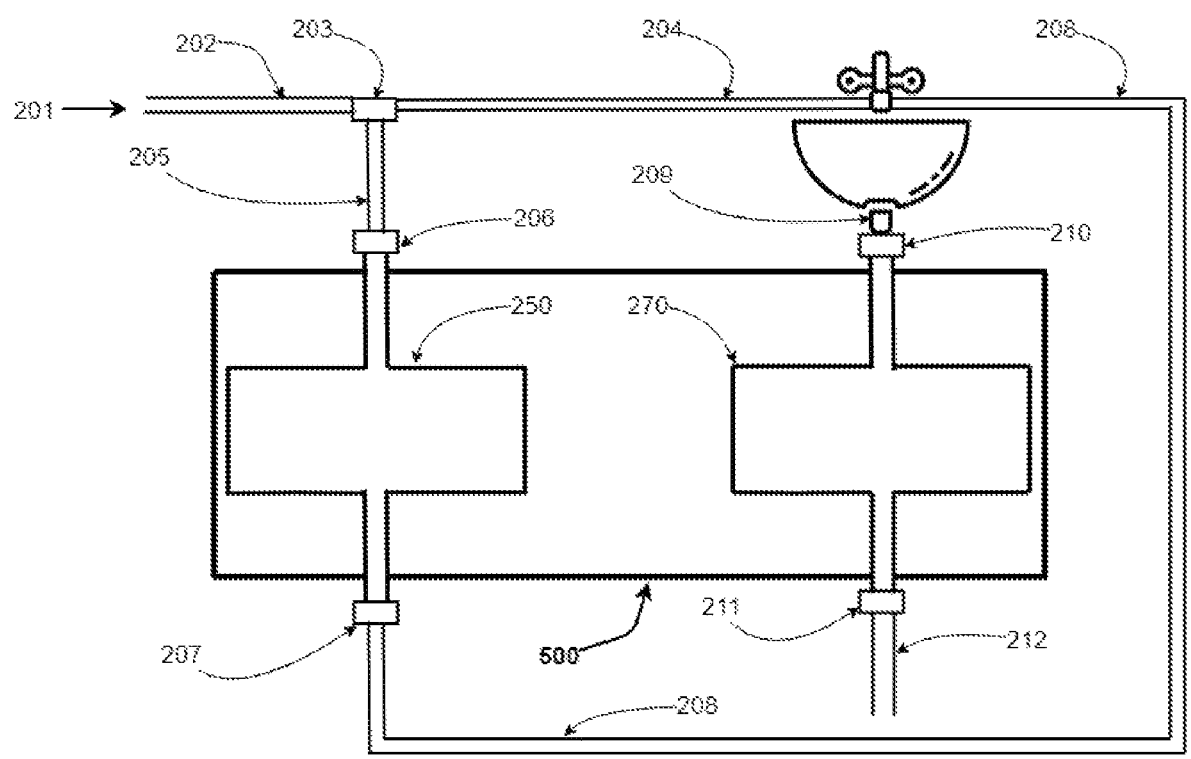
FIG. 2 depicts a pictorial and graphical diagram of a drain liquid based liquid (e.g., water) heater for a Point of Use (POU) application under a kitchen or bathroom sink, according to an exemplary embodiment of the present disclosure.
Figure 3:
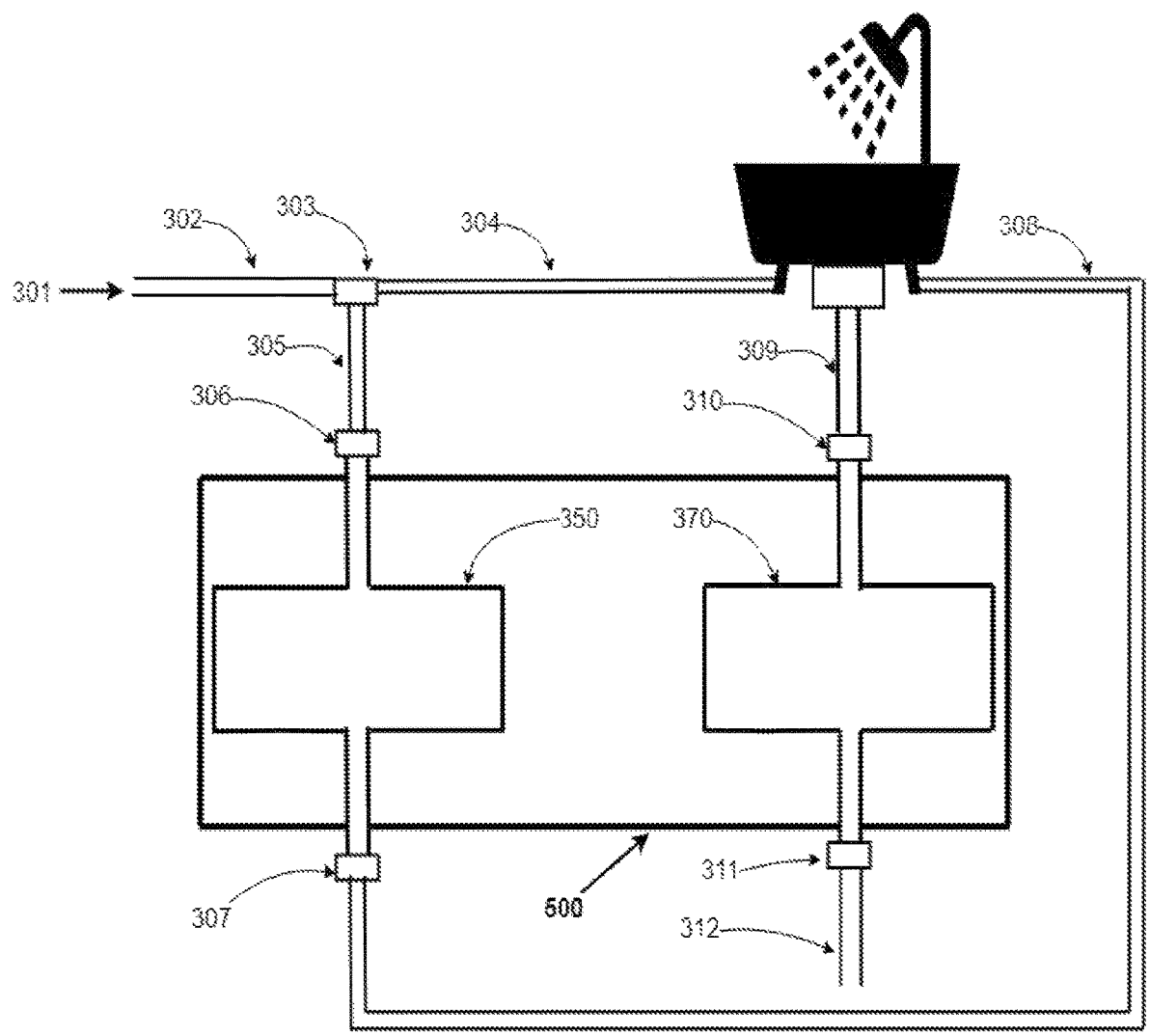
FIG. 3 depicts a pictorial and graphical diagram of the drain liquid based liquid (e.g., water) heater for a POU application in bathroom or community showers, according to an exemplary embodiment of the present disclosure.

Referring to FIGS. 1-3, the cold source liquid indicated by 101, 201 and 301 may be supplied through a cold liquid supply line (102, 202 and 302). At junction (103, 203 and 303), the cold liquid supply line may bifurcate. One cold liquid supply line (104, 204 and 304) may supply cold liquid for use in the building, sink or shower. Another cold liquid supply line (105, 205 and 305) may lead to a cold liquid inlet (106, 206 and 306) of a condenser chamber (150, 250 and 350). As will be described in this section, the cold liquid may be heated to produce hot liquid that will leave the condenser chamber from a hot liquid outlet (107, 207 and 307). From this hot liquid outlet, the hot liquid supply line (108, 208 and 308) may take the hot liquid for use in the home or building, kitchen sink or bathroom sink, or in shower.

Drain liquid input line, indicated by 109, 209 and 309, may be a building's drain line and/or the line under a sink and/or shower of a kitchen and/or bathroom. The drain liquid input line may divert waste liquid after use into the drain liquid inlet (110, 210 and 310) of the evaporator chamber (170, 270 and 370). As will be described in this section, thermal energy may be extracted from the drain liquid. The cold drain liquid may be exported out through the drain liquid outlet (111, 211 and 311), into the drain liquid output line (112, 212 and 312).

FIG. 4 depicts a pictorial and graphical diagram of the liquid (e.g., water) cooling system based on heat transfer from the drain liquid in a bathroom or community shower, according to an exemplary embodiment of the present disclosure. The embodiment as depicted in FIG. 4 may be used for cooling the source liquid by transferring the thermal energy to the drain liquid in a shower.

The hot source liquid indicated by 401 may be supplied through a hot liquid supply line (402). This hot liquid may enter the evaporator chamber (470) at the junction (403). As will be described in this section, the hot liquid may be cooled to produce a cooler liquid ("cold liquid") that may leave the evaporator chamber (470) from a cold liquid outlet (404). From this cold liquid outlet, the cold liquid supply line (405) may deliver the cold liquid for use in the shower.

Thermal transfer between two liquids, designated as liquid "A" and liquid "B" for simplicity, may be accomplished by at least one 'liquid to liquid heat pump' (500), e.g., as depicted in FIG. 5. The heat pump may include a refrigerant, which may be contained in, or included within, a closed or semi-closed system comprising of a compressor (504), coils (501) (or other means for transporting the refrigerant), a condenser (530) contained or included within a condenser chamber (550), an expansion valve (505) and an evaporator (540) contained or included within an evaporator chamber (570). In some embodiments, as in the systems depicted in FIGS. 2, 3 and 4 components of the heat pump are shown together (500), whereas in some embodiments, e.g., as in the system depicted in FIG. 1, the evaporator chamber (170, 570) is shown as being separate from the other components of the heat pump to indicate the evaporator chamber's location being outside the building.

When the refrigerant travels through the compressor (504), the high pressure compression may rapidly heat the refrigerant. The heated refrigerant carried within the coil (501) may enter the condenser (530). The cold inlet (506) may allow entry of the cold liquid "A" into the condenser chamber (550). There, the cold liquid "A" may come in contact with the condenser (530) containing the hot refrigerant. Heat transfer may occur between the heated refrigerant and the cold liquid "A". The heated liquid "A" may flow out of the hot liquid outlet (507).

When the refrigerant carried by the coil (501) enters the expansion valve (505), the expansion may rapidly cool the refrigerant. The resulting cold refrigerant carried by the coil (501) may enter the evaporator (540) in the evaporator chamber (570). The liquid inlet (510) may allow entry of the liquid "B" which may be hotter than the refrigerant. This liquid "B" may come in contact with the cold refrigerant within the evaporator (540). Heat transfer may occur between the cold refrigerant and the hotter liquid "B". This heat transfer may facilitate the flow of heat from the liquid "B" back into the cold refrigerant. Once the heat is extracted, the resulting cooler liquid "B" may flow out through the liquid outlet (511).

FIGS. 6 and 7 depict methods of drain based liquid heating and drain based liquid cooling, respectively, according to exemplary embodiments of the present disclosure. Thus, FIGS. 6 and 7 illustrate exemplary methods for exchanging thermal energy between two liquids for the purpose of heating and cooling, respectively.

For heating a source liquid using the heat extracted from a drain liquid, the refrigerant at temperature $T_{r0}$ and pressure $P_{r0}$ (601) may be compressed by a compressor to the pressure $P_{r1}$ and heated to temperature $T_{r1}$ (602) using electricity (610). The refrigerant may transfer the heat (620) to the source liquid (603, 606). Through this process, the refrigerant may cool to temperature $T_{r2}$ and the source liquid may heaten up. The resulting hot source liquid may be used by users (e.g., to wash hands or the body, clean dishes, use in industrial production, etc.) and may go to a drain after use (607). The cold refrigerant may undergo an expansion to the pressure $P_{r2}$ through the expansion valve (604), and this process may further cool the refrigerant to the temperature, $T_{r3}$. The drain liquid, being hotter than the refrigerant, may transfer heat (630) to the cold refrigerant (605). The refrigerant may be heated to temperature $T_{r4}$ and may return to the compressor to repeat the cycle (e.g., one or more of the steps described above for heating a source liquid).

For cooling a source liquid, the hot source liquid (706) may cool down (707) by transferring its heat (740) to the refrigerant (705). The resulting cold liquid may be used by users, and before going to the drain after use (708). Furthermore, the refrigerant at the temperature $T_{r0}$ and pressure $T_{r0}$ (701) may be compressed by compressor to the pressure PH and may be heated to the temperature $T_{r1}$ (702) using electricity (720). The refrigerant may transfer the heat (730) to the drain liquid (703, 709). Thereafter, the heated drain liquid may exit (710). Through this process, the refrigerant may cool to the temperature $T_{r2}$. The cold refrigerant may undergo expansion to the pressure $P_{r2}$ through the expansion valve (704) and this may further cool the refrigerant to the temperature $T_{r3}$. The source liquid, being hotter than the refrigerant, may transfer heat (740) to the cold refrigerant (705), as discussed earlier. The refrigerant may get heated to the temperature $T_{r4}$ and may return to the compressor to repeat the cycle (e.g., one or more of the steps described above for cooling a source liquid).

FIG. 8 depicts a pictorial and graphical diagram of components for the control and/or measurement of physical properties within an exemplary liquid to liquid head pump device or system (e.g., as the system depicted in FIG. 5). Temperature sensors as indicated by TI (810, 811 and 812) may be located in the condenser chamber, on the evaporator and in the evaporator chamber. Liquid level may be measured by the liquid indicators, LI (830, 831) in the condenser chamber and evaporator chamber. Liquid flow may be measured and controlled at the exit of the evaporator chamber by the flow control valve (840). Pressure indicators (820, 821, 822) may be equipped to indicate pressure in the liquid and/or refrigerant at various points in the system for the purpose of measurement and control. A control board (850) may become a part of the system.

FIG. 9 is a block diagram of a method of drain liquid based liquid heating in a storage tank using thermal energy extracted from the drain liquid, e.g., using the system as depicted in FIG. 5, according to an exemplary embodiment of the present disclosure. A source liquid in a storage tank may deliver heated liquid for use (901, 902). After use of the heated liquid, the used liquid may go to the drain (903) where heat (905) may be extracted from the liquid that went down the drain ("drain liquid"). This heat may be used to heat up the incoming source liquid (906), and the resulting heated liquid may be transported to the storage tank. The drain liquid, after losing heat, may exit (904).

FIG. 10 is a block diagram of a method of heating a liquid (Liquid "B") using thermal energy extracted from another liquid (Liquid "A"). The method may be performed by or performed using the system as depicted in FIG. 5. For example, the system may extract heat (1003) from a drain liquid (Liquid "A") having thermal energy (1001). The extracted heat may then be used to heat a second liquid (Liquid "B") (1004, 1005). Drain liquid (Liquid "A") after losing its heat may exit (1002).

FIG. 11 depicts a pictorial and graphical diagram of a system comprising of a plurality of systems described herein (e.g., as depicted in FIG. 5) that are combined together for heating and/or cooling a source liquid, according to an exemplary embodiment of the present disclosure. Source liquid (1101) may be brought in through a check valve (1102) to a manifold (1003). The manifold may deliver the source liquid to individual inlet lines (1120, 1130, 1140) of the plurality of various systems described herein, where the liquid may receive heat, and get heated. The heated liquid from each of the outlets may flow to a manifold (1104) from where the heated liquid (1105) is delivered for use. Similarly, heated drain liquid (1151) may at first be collected to a drain manifold (1153) which delivers heated drain liquid to the individual drain inlet. After losing heat in the system, cold drain liquid (1155) may exit the system via the drain manifold (1154).

FIG. 12 depicts a pictorial and graphical diagram illustrating the assembly of a drain liquid based liquid heater (e.g., as the system depicted in FIG. 2), according to an exemplary embodiment of the present disclosure. The diagram illustrates exemplary methods for the assembly. The methods of assembly may be implemented on standalone residential, commercial, and industrial facilities that utilize a source liquid (e.g., water expelled from a water faucet that for use), a drain liquid (waste water expelled from a sink corresponding to the water faucet), and conventional water heaters. For clarity, the drain liquid based liquid heater being assembled or retrofitted over conventional water heating systems may be like one of the systems described above. The diagram depicts a drain liquid based liquid heater 1211, as described in the present disclosure, and a conventional water heater 1207. For clarity, conduits (e.g., pipes, coils, pathways) that lead to, lead from, or was configured for the conventional water heating (e.g., using conventional water heater 122) are shown as dashed lines while conduits (e.g., pipes, coils, pathways) leading, leading from, or configured for the drain liquid based liquid heating are shown in solid lines. FIG. 12 depicts a cold water source 1201 delivering cold water, conduit(s) 1205A and 1205B, that enable the flow of cold water from the cold water source 1201 to the (conventional) water heater 1207 that heats the cold water from the cold water to form hot water, conduit(s), 1209A and 1209C, that enable the flow of hot water from the (conventional) water heater 1207 to an outlet for the source liquid 1217 (e.g., a water faucet, shower hose, etc. 1221) and conduit(s), 1225A, 1225B, and 1227 that enable the flow of a drain liquid from an inlet (e.g., a sink) 1223. A method of assembling or retrofitting a drain liquid based water heating system (which includes drain liquid based water heater 1211) may include bifurcating or diverting conduit(s) 1205A and/or 1205B so that they enable the flow of the cold water from the cold water source 1201 to a heat exchanger 1213 of the drain liquid based liquid heater, e.g., the second heat exchanger of the drain liquid based liquid heating system described above. Thus, the bifurcated or diverted conduit 1205C carries the cold water to the heat exchanger 1213 of the drain liquid based water heater 1211. The method may further include bifurcating or diverting conduit(s) 1209A and 1209C so that they now enable the flow of the hot water from the said heat exchanger 1213 (e.g., the second heat exchanger of the drain liquid based liquid heating system described above) to the opening for the source liquid (e.g., water faucet) 1217. For example, the diverted or bifurcated conduit(s) 1209B and 1209C enable the flow of hot water from the second heat exchanger 1213 of the drain liquid based liquid heater 1211 to the to the opening for the source liquid (e.g., water faucet) 1217. Furthermore, conduit(s) 1225A and 1227 may be altered so that they enable the flow of the drain liquid through another heat exchanger 1215 of the drain liquid based liquid heater 1211 (e.g., the first heat exchanger 1215 of the drain liquid based liquid heating systems described above). The source liquid may be one or more of the cold water, the hot water, or a mixture of the cold water and the hot water. The source liquid becomes at least a part of, or the entirety of, the drain liquid after use. For example, a user may use a combination of hot and cold water to wash dirt off her hands. The collected drain liquid may be lukewarm water (a combination of the hot and cold water) mixed with the dirt.

It is contemplated similar methods presented above may be used for the assembly of a drain liquid based liquid cooler. In some embodiments, the methods of assembly or retrofitting may further include activating the transporting of the refrigerant through the cyclical pathway of a drain liquid based liquid heating system described above. The activation may be powered by an electric source (not shown).

It is contemplated that one or more components of the assembled drain liquid based liquid heating or cooling system may perform or be used to perform a method of drain liquid based liquid heating or cooling. For example, for drain liquid based liquid heating, one method may include activating the transporting of a refrigerant through a cyclical pathway comprising of two or more heat exchangers, the compressor, and the expansion valve. For example, a heat pump comprising of the above-described component may be activated, e.g., by turning on a power. The compressor may heat the refrigerant via compression, and the expansion valve may cool the refrigerant via expansion. The method may further include: receiving, at the second heat exchanger 1213, a flow or a volume of the source liquid that is desired by a user to be heated. The outlet for the source liquid 1217 may be enabled to have the source liquid flow for use by the user. For example, a faucet may be turned on, allowing water (a liquid) to flow for use by a user seeking to wash hands. An inlet 1223 may enable the drain liquid to drain down from a sink 1221. The first heat exchanger 1215 may receive a flow or a volume of the drain liquid. The method may further include facilitating the exchange of heat from the flow or the volume of the drain liquid to the refrigerant at the first heat exchanger, and facilitating the exchange of heat from the refrigerant to the flow or the volume of the source liquid received at the second heat exchanger 1213. Thus, the source liquid, as a result of the heat exchange, may be heated. The outlet for the source liquid 1217 may thus enable the flow of the heated source liquid.

FIG. 13 depicts a graphical diagram of the experimental results obtained for the system as disclosed embodiment depicted in FIG. 2. The results are shown as Coefficient of Performance (COP) of the system for various inlet water flow rates in gallons per minute (gpm). A COP may be an indicia of performance of a heat pump, heat pump facility, or a system applying or utilizing a heat pump. For example, a COP may be a ratio of useful heating or cooling provided to work required. Higher COPs may relate to lower operating costs. The COP may usually exceed 1, especially in heat pumps, because, instead of just converting work to heat (which, if 100% efficient, would be a COP of 1), it pumps additional heat from a heat source to where the heat may be needed. The results for the CoP exceeding one (1) may indicate that the heat energy received by the source water is more than the input energy into the system consisting the drain water.

It will be understood that each of the elements described above, or two or more together may also find a useful application in other types of apparatus and methods differing from the type described above.

Referring to FIG. 14, there is shown the system in accordance with the system and method of the preferred exemplary embodiment of the present invention. The system 1400 includes a commercial dishwasher 1402. The commercial dishwasher 1402 is a door-type commercial dishwasher, and is situated on a stand above the ground below. Other types of commercial dishwashers may also be used in the system and method of the present invention. The commercial dishwasher 1402 has a hot water inlet 1404. Typically, this hot water inlet 1404 is connected to a hot water line extending from the hot water heater of the restaurant or other space utilizing the dishwasher. The commercial dishwasher 1402 has a wastewater outlet 1406 situated below the enclosure of the commercial dishwasher 1402. The wastewater outlet 1406 is positioned a distance above the ground below.

The system 1400 of the present invention has a first enclosure 1408 and a second enclosure 1410. The first enclosure 1408 is provide to heat cold water, and contains a first heat exchanger 1450, preferably having a condenser, and other components as described hereinbelow. The first enclosure 1408 has a cold water inlet 1412 which is connected to a source of cold water, and a hot water outlet 1414 which extends outwardly therefrom and is connected to the hot water inlet 1404 of the commercial dishwasher 1402. The hot water line 1416 extends between the hot water outlet 1414 of the first enclosure and the hot water inlet 1404 of the commercial dishwasher 1402.

A coil loop 1418 is established between the first enclosure 1408 and the second enclosure 1410. The coil loop 1418 passes a refrigerant in a loop between the first enclosure 1408 and the second enclosure 1410. The second enclosure 1410 captures waste heat from the wastewater of the dishwasher, and contains a second heat exchanger 1452, preferably having an evaporator, and is described hereinbelow. A drain outlet 1422 is provided at one end of the second enclosure 1410 and is connected to the restaurant's drain system.

FIG. 14A is a diagram illustrating the system of the present invention. In FIG. 14A, there is shown the first enclosure 1408. The first enclosure 1408 has a compressor 1424 provided therein. The compressor 1424 is connected to a suitable source of electricity. The electricity source can be a renewable energy source, if available. The compressor 1424 is connected in-line with the coil loop 1418. Refrigerant passing through the coil loop 1418 to the compressor 1424 is heated by compression. The heated refrigerant passes into the condenser 1426 of the condenser chamber 1428.

Water flowing into the first enclosure 1408 from the cold water inlet 1412 enters the condenser chamber 1428. The water is then heated through heat exchange with the heated and compressed refrigerant within the condenser 1426. This heated water then passes outwardly of the first enclosure 1408 via the hot water outlet 1414.

FIG. 14A shows the water from the hot water outlet 1414 entering the hot water inlet 1404 of the commercial dishwasher 1402. FIG. 14A also shows an optional electrical coil heater 1436. The system of the present invention is able to heat cold water to a temperature of approximately 160° F. However, to boost the temperature to approximately 180° F., this optional electrical coil heater 1436 may be provided. Certain commercial dishwashers require higher temperatures for operation, and such an optional electrical coil heater 1436 can be useful for these purposes.

After the dishwasher cycle, the heated wastewater passes through the drain 1406 of the commercial dishwasher 1402. The water from the drain 1406 passes into the inlet 1420 of the second enclosure 1410. This hot water then enters evaporator chamber 1434.

The refrigerant in the cooling line, coming from the first enclosure 1408 enters the second enclosure 1410. An expansion valve 1430 is provided, which cools the refrigerant by expansion. This cooled refrigerant in the coil loop 1418 then enters the evaporator 1432 within the evaporator chamber 1434. The cooled refrigerant in the coil loop 1418 collects heat in a heat exchange relationship with the heated wastewater in the evaporator chamber 1434.

Preferably, the evaporator chamber 1434 has a structure suitable for holding or delaying the release of the heated wastewater for period of time so as to more efficiently capture the heat from the heated wastewater. For example, a plumbing trap may be used in this application. Once the water has passed through the evaporator chamber 1434, the water then goes through the drain outlet 1422 into the drain system of the restaurant or other facility.

FIG. 14A also illustrates a pump 1438 provided between the drain 1406 of the commercial dishwasher 1402 and the inlet 1420 of the second enclosure 1410. This pump 1438 can be provided in the case where it is necessary to transport the hot water from the commercial dishwasher a distance vertically and/or horizontally to the location of the second enclosure 1410.

Adjacent the pump 1438 is shown an optional filter 1439. The filter 1439 can be provided on the drain water line between the commercial dishwasher 1402 and the second enclosure 1410. The filter 1439 operated to ensure that drain water entering the evaporator chamber 1434 of the second enclosure 1410 is clean and does not clog the system.

FIG. 14A also illustrates a set of controls 1440. The controls 1440 are connected to a temperature sensor 1442. The temperature sensor 1442 is positioned within the second enclosure 1410 at or adjacent the evaporator 1432. The temperature sensor 1442 monitors the temperature at the evaporator 1432 so as to detect a freezing condition therein. If a freezing condition is detected, then the controls 1440 operate to shut off the compressor 1424 within the first enclosure 1408.

The present invention is also modular. In some cases, within the concept of the present invention, it may be desired to utilize more than one first enclosures/compressor units to achieve a required heat capability or water flow. Additionally, a single first enclosure may be connected to more than one dishwasher, or a dishwasher and another system(s) that may require hot water, such as a sink. Drain water from the sink could be fed into the second enclosure 1410 with appropriate plumbing. Similarly, multiple second enclosures or second heat exchangers can be provided to more efficiently capture waste heat from the wastewater of the commercial dishwasher.

Referring to FIG. 15, there is shown an optional tee fitting 1500 which can be placed in line with the hot water flow of the system of the present invention (via the hot water line 1416). The tee 1500 having appropriate valves can receive water 1502 from the existing hot water system of the restaurant or facility, and also receive heated water from the first enclosure 1408. This water is then provided to the hot water inlet 1404 of the commercial dishwasher. This tee can be useful so as to supplement heating capacity of the system of the present invention, and allows the facility to switch between systems in the event of the mechanical difficulties.

The present invention is able to efficiently provide hot water at 180° F., with up to 160° F. water being available without boosting with an electrical coil heater. The system of the present invention significant reduces energy usage for restaurant and other facilities utilizing commercial dishwashers.

While certain novel features of this disclosure have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present disclosure. Of particular note, this disclosure covers embodiments where other liquids instead of liquid are being used.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A system for providing hot water to a commercial dishwasher, the dishwasher having a hot water inlet and a wastewater outlet, the system comprising:
   a first heat exchanger connected to the hot water inlet of the dishwasher and to a cold water source, said first heat exchanger having a condenser therein;
   a second heat exchanger connected to the wastewater outlet of the dishwasher, said second heat exchanger comprising an evaporator chamber having an evaporator positioned therein, said evaporator chamber adapted to cool hot water received from the wastewater outlet of the dishwasher, said evaporator chamber comprising a plumbing trap; and
   a coil loop having a refrigerant therein, said coil loop passing said refrigerant through a compressor and into said condenser of said first heat exchanger, said coil loop passing said refrigerant from said condenser of said first heat exchanger through an expansion valve and into said evaporator of said second heat exchanger.

2. The system of claim 1, said first heat exchanger and said compressor being positioned in a first enclosure, said second heat exchanger and said expansion valve being positioned in a second enclosure.

3. The system of claim 2, said second enclosure being positioned adjacent the wastewater outlet of the dishwasher.

4. The system of claim 2, further comprising:
   a pump positioned between the wastewater outlet of the dishwasher and said second enclosure.

5. The system of claim 1, said condenser being positioned within a condenser chamber, said condenser chamber adapted to heat cold water received from the cold water source therein.

6. The system of claim 1, further comprising:
an electrical coil heater positioned between said first heat exchanger and the hot water inlet of the dishwasher.

7. The system of claim 1, further comprising:
a temperature sensor positioned to monitor the temperature of said evaporator, and
controls in communication with said temperature sensor.

8. A commercial dishwashing system comprising:
a dishwasher having a hot water inlet and a wastewater outlet;
a first enclosure connected to a cold water source and to said hot water inlet of said dishwasher, said first enclosure having a first heat exchanger therein, said first heat exchanger comprising a condenser adapted to heat cold water from the cold water source and to pass the heated water to said hot water inlet of said dishwasher, said first enclosure comprising:
a compressor; and
a condenser chamber having said condenser therein, said condenser connected to said compressor, said condenser chamber adapted to receive cold water from the cold water source;
a second enclosure connected to said wastewater outlet of said dishwasher, said second enclosure having a second heat exchanger therein, said second heat exchanger adapted to capture heat from wastewater flowing from said wastewater outlet of said dishwasher; and
a coil having a refrigerant therein, said coil comprising a loop for passing said refrigerant between said first enclosure and said second enclosure, said compressor and said condenser being fluidly connected inline with said coil.

9. The system of claim 8, said second enclosure comprising:
an expansion valve; and
an evaporator chamber having an evaporator therein, said evaporator connected to said expansion valve, said evaporator chamber adapted to receive hot wastewater from said wastewater outlet of said dishwasher, said expansion valve and said evaporator being fluidly connected inline with said coil.

10. The system of claim 9, wherein said evaporator chamber comprises a plumbing trap.

11. The system of claim 8, further comprising:
a pump positioned between said wastewater outlet of said dishwasher and said second enclosure.

12. The system of claim 9, further comprising:
a temperature sensor positioned to monitor the temperature of said evaporator; and
controls in communication with said temperature sensor.

13. The system of claim 8, further comprising:
a tee positioned between said first enclosure and said hot water inlet of said dishwasher, said tee being connected to a hot water source.

14. A method for providing hot water to a commercial dishwasher, the method comprising:
providing a coil loop having a refrigerant therein, said coil loop passing between a first heat exchanger and a second heat exchanger;
flowing cold water into said first heat exchanger;
compressing the refrigerant;
heating the cold water within the first heat exchanger with the compressed refrigerant;
flowing the heated water to the commercial dishwasher for use therein;
draining the used heated water into a second heat exchanger;
expanding the refrigerant; and
heating the expanded refrigerant within the second heat exchanger with the drained heated water, said second heat exchanger comprising an evaporator within an evaporator chamber, said used heated water being drained into said evaporator chamber, said evaporator chamber adapted to delay the release of the used heated water.

15. The method of claim 14, further comprising:
providing an electrical heater between the first heat exchanger and the commercial dishwasher.

16. The method of claim 14, said first heat exchanger comprising a condenser within a condenser chamber, said cold water being flowed into said condenser chamber.

* * * * *